(12) United States Patent
Lee

(10) Patent No.: US 6,523,987 B1
(45) Date of Patent: Feb. 25, 2003

(54) FIBER OPTIC LIGHT ASSEMBLY FOR FISHING ROD AND BULB THEREFOR

(76) Inventor: Chester Roy Lee, 913 State St., Suite 803, Erie, PA (US) 16501

( * ) Notice: Subject to any disclaimer, the term of this patent is extended or adjusted under 35 U.S.C. 154(b) by 0 days.

(21) Appl. No.: 09/586,309

(22) Filed: Jun. 2, 2000

(51) Int. Cl.[7] ................................................. A61B 1/24
(52) U.S. Cl. ....................... 362/577; 362/581; 362/120; 43/17.5; 43/25
(58) Field of Search .............................. 362/577, 581, 362/109, 120, 556, 582, 555; 43/17.5, 18.1, 25; 385/31, 901

(56) References Cited

U.S. PATENT DOCUMENTS

| | | | | |
|---|---|---|---|---|
| 4,223,466 A | * | 9/1980 | King ............................ | 43/18 R |
| 4,329,737 A | * | 5/1982 | Triller et al. ................ | 362/555 |
| 4,369,486 A | * | 1/1983 | Pool ............................ | 362/32 |
| 4,617,751 A | * | 10/1986 | Johansson ................... | 43/17.5 |
| 5,511,335 A | * | 4/1996 | Langer ......................... | 43/4 |

* cited by examiner

*Primary Examiner*—Sandra O'Shea
*Assistant Examiner*—Bertrand Zeade
(74) *Attorney, Agent, or Firm*—Richard K. Thomson

(57) ABSTRACT

An assembly including a power source, a device for attaching the power source to a lower portion of a fishing rod, a length of fiber optic cable with a plurality of clips for securing the cable to the rod, and a light bulb. The light bulb which may have utility in other applications, includes a configured mass of plastic which encloses a region of reduced density which defines a first reflective region while the exterior of the bulb defines a second reflective region. The light bulb has a recess which receives a second end of the fiber optic cable so that the cable conducts a light beam to the bulb where it engages the first reflective surface and is bounced between the first reflective surface and the second reflective surface. Preferably, an electrical shrink tubing forms a sleeve over the first few inches adjacent the power source to focus the light beam along the cable. Color may be added to the bulb for alternate decorative uses.

7 Claims, 1 Drawing Sheet

FIBER OPTIC LIGHT ASSEMBLY FOR FISHING ROD AND BULB THEREFOR

BACKGROUND AND SUMMARY OF THE INVENTION

The present invention is directed to a light for night fishing. More particularly, the present invention is directed to a fiber optic light that can be attached to a fishing pole and to a bulb which can be used with fiber optic lighting.

Night fishing is fraught with problems. Not being able to see to bait one's hook, or to avoid limbs or other obstructions can be terribly frustrating. Hence, the fisherman often brings a light of some sort. However, since the angler needs full use of his hands, the use of a lantern, flashlight or other handheld light can be problematic. Further, even if the light source can be suspended from a stand, bar, pole, or the like, on the dock or in the boat, the light source and its support can both inhibit the angler's freedom to cast by restricting her/his free space.

The present invention overcomes these difficulties by providing a fiber optic light assembly including a power source which is attachable to/detachable from a lower portion of the fishing rod, a fiber optic cable having first and second ends, the first end attached to the power source, the second end attached to an upper end of the fishing pole. Clips are used to attach the fiber optic cable to the fishing rod at a plurality of points along its length. A bulb is secured to the second end of the fiber optic cable to disperse light conducted by the fiber optic cable. The bulb is a configured mass of plastic selected from the group of polypropylene, polycarbonate, and acetyl resins. A less dense mass of material, preferably a bubble is encapsulated within the plastic and provides a first reflective surface. The bubble itself may comprise air, phosphorescent material, or argon. The external surface of the light bulb provides a second reflective surface, the light conveyed by the fiber optic cable bouncing between the first and second reflective surfaces to illumine the light bulb. A sheath can be used to focus the light down the length of the fiber optic cable toward its second end. The sheath of electrical shrink tubing surrounds the fiber optic cable adjacent the first end which is attached to the power source in order to prevent random disbursement over the first few inches of the fiber optic cable.

Not only will the light at the tip of the rod help the fisherman see to bait her/his hook, it enables the fisherman to easily detect a nibble or strike since movement of the rod tip will become much more readily visible.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is described in conjunction with the associated drawings in which like features are indicated with like reference numerals and in which.

DETAILED DESCRIPTION OF THE PREFERRED EMBODIMENT

Figure 1:
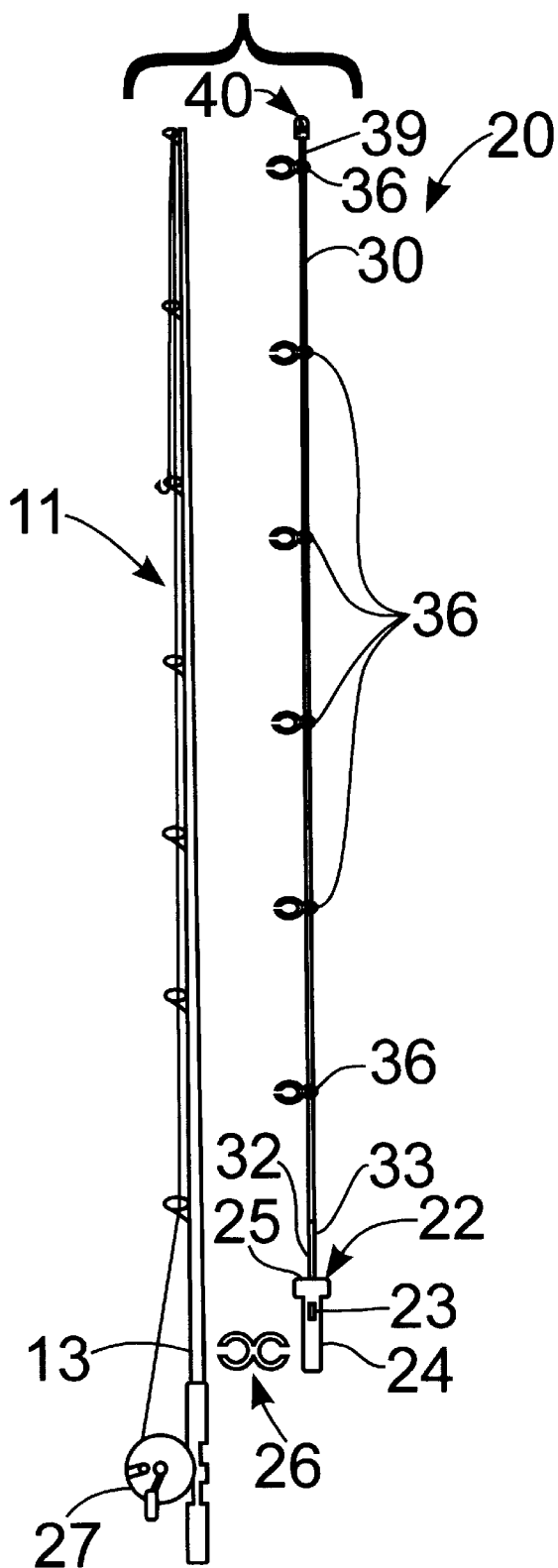
FIG. 1 is a side view of a first embodiment of the fiber optic light assembly for a fishing rod of the present invention.

The fiber optic light assembly of the present invention is shown in FIG. 1 generally at 20. The cable assembly includes a power source 22, means 26 to attach the power source 22 to and to detach the Power source 22 from a lower end 13 of fishing rod 11, a length of fiber optic cable 30, a plurality of clips 36 for attaching the cable along the length of fishing rod 11, and a light bulb 40. Power source 22 is a commercially available pocket flashlight that has been modified by removing the lens from the housing 24 and forming a small opening in the end 25 to receive a first end 32 of fiber optic cable 30. The cable may be fixed in the small opening by melting the end 32 to make it larger than the diameter of the opening. A suitable pocket flashlight is commercially available from Garrity Industries. Preferably, a sheath 33 is formed on the first few inches (3 or so) of end 32 that extend from end 25 of the power source 22. This sheath 33, which is preferably made of an electrical shrink tubing, focuses the light beam down the cable 30 intensifying the light which arrives at second end 39.

Figure 3:
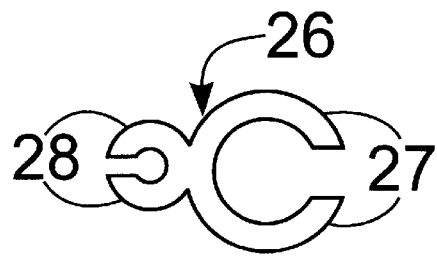
FIG. 3 is an enlarged top view of the clip used to attach the power pack to the fishing rod.
Figure 4:
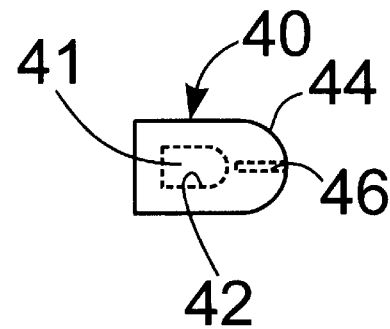
FIG. 4 is an enlarged side view of a light bulb of the present invention.

Means 26 for attaching the power source 22 to the fishing rod comprises a spider clamp having two arms 27 that encircle the power source 22 and two arms 28 which clip onto the fishing pole 11 near the handle 15 (FIG. 3). By positioning the power source 22 near the handle 15 and reel 17, power source 22 will not upset the balance of the fishing rod 11 and will itself experience a minimum amount of separation force as a result of the casting motion.

Figure 2:
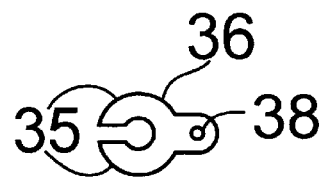
FIG. 2 is an enlarged top view of a clip used to attach the fiber optic cable to a fishing rod.

Each of a plurality of clips 36 (FIG. 2) receive cable 30 through an opening 38 designed to snugly slide along cable 30 to an appropriate position which does not engage the eyelets on fishing rod 11. As depicted in FIG. 1, the clips 36 are rotated 90° out of plane to show more than just their edge profile. Clips 36 have a pair of arms 35 which encircle rod 11 and hold the fiber optic cable securely thereto.

Light bulb 40 is a configured mass of plastic chosen from the group of polypropylene, polycarbonate, and acetel resins. In the preferred embodiment, the plastic is polycarbonate. While the bulb 40 is depicted as generally bell shaped, it will be appreciated that the light bulb 40 could be molded into any shape desired. Light bulb 40 has a region of reduced density 41 that defines a first reflective region or surface 42. This region of reduced density 41 is preferably created by introducing a bubble into the configured mass of plastic. The bubble may simply be air or, to enhance its reflective characteristics, the bubble could be filled with argon or a phosphorescent material. The exterior 44 of the bulb 40 defines a second reflective region or surface. A cylindrical bore 46 fits snugly on the second end of cable 39. Second end 39 delivers the conducted light to region 41 where the light is reflected between first and second reflective surfaces 42 and 44 scattering light generally equally spherically about the bulb 40. This provides a light bulb 40 which can be seen from any direction, unlike the tip of a conventional fiber optic cable.

It will be appreciated that bulb 40 has numerous other potential applications. In some of those applications, particularly for decorative applications and certain functional applications, it may be desirable for the bulb 40 to produce colored light. In such cases, pigment may be added to the plastic prior to forming the configured mass of plastic or introduced as a colored gel.

The fiber optic light assembly 20 of the present invention is being marketed under the trademark NIGHT NIBBLER. The assembly includes the light source 22 to which a length of fiber optic cable 30 of sufficient length to accommodate the largest fishing rods with which the assembly 20 will be used is attached. Instructions are included which direct the user to cut the cable to the appropriate length and to snap the light bulb 40 onto the second end 39 of cable 30. In this manner, the NIGHT NIBBLER assembly can be customized to fit any size fishing rod imaginable. When the assembly 20 is to be used for night fishing, switch 23 activates power source 22 and illuminates bulb 40.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A fiber optic light assembly kit for retrofitting any fishing rod comprising
    a) a power source;
    b) means to attach/detach said power source to/from an external portion of a lower end of the fishing rod;
    c) a fiber optic cable having a first upstream end and a second downstream end, said first upstream end being attached to said power source and said second downstream end being attachable to an upper external end of the fishing rod;
    d) clip means to attach/detach said fiber optic cable to/from an external portion of the fishing rod at a plurality of points along its length;
    e) a bulb securable to said second downstream end of said fiber optic cable, thereby receiving light from said fiber optic cable and dispersing it.

2. The fiber optic light assembly kit of claim 1 wherein said bulb disperses light equally in all directions spherically thereabout.

3. The fiber optic light assembly kit of claim 2 wherein said light bulb comprises a configured mass of plastic material which has an internal less dense mass defining a first reflective region.

4. The fiber optic light assembly kit of claim 3 wherein said less dense mass comprises a bubble encased in said configured plastic mass.

5. The fiber optic light assembly kit of claim 4 wherein said bubble encapsulates a material selected from the group consisting of air, argon, and phosphorescent material.

6. The fiber optic light assembly kit of claim 3 wherein said plastic material is selected from the group consisting of polypropylene, polycarbonate and acetyl resins.

7. The fiber optic light assembly kit of claim 1 further comprising a sheath surrounding a portion of said fiber optic cable adjacent its first end to focus a beam of light along said length of fiber optic cable to its second end.

* * * * *